United States Patent [19]

Peterson

[11] 4,435,097
[45] Mar. 6, 1984

[54] LAMINATED BEARING STRUCTURES

[75] Inventor: Robert R. Peterson, Hudson, Mass.

[73] Assignee: Barry Wright Corporation, Newton Lower Falls, Mass.

[21] Appl. No.: 17,823

[22] Filed: Mar. 5, 1979

Related U.S. Application Data

[63] Continuation of Ser. No. 806,811, Jun. 15, 1977, abandoned.

[51] Int. Cl.³ .................. F16C 27/06; F16C 27/08
[52] U.S. Cl. ............................................. 384/221
[58] Field of Search .............. 308/26, 237 R, DIG. 8, 308/2 R, 2 A, 135, 163; 267/140, 152; 305/42; 156/300, 304, 306; 384/221, 222, 220, 223, 215

[56] References Cited

U.S. PATENT DOCUMENTS

| | | | |
|---|---|---|---|
| 2,900,182 | 8/1959 | Hinks | 308/2 R |
| 3,377,110 | 4/1968 | Boggs | 305/42 |
| 3,380,557 | 4/1968 | Peterson | 267/140 |
| 3,679,197 | 7/1972 | Schmidt | 267/152 |
| 3,941,433 | 3/1976 | Dolling et al. | 308/DIG. 8 |
| 4,040,690 | 8/1977 | Finney | 308/26 |
| 4,105,266 | 8/1978 | Finney | 308/237 R |

*Primary Examiner*—Lenard A. Footland
*Attorney, Agent, or Firm*—Milton E. Gilbert; Gary E. Ross

[57] ABSTRACT

Laminated elastomer bearings of the type comprising alternating bonded layers of resilient material and non-extensible material are improved by forming at least some of the resilient layers of at least two different stocks having different elasticity characteristics.

10 Claims, 3 Drawing Figures

LAMINATED BEARING STRUCTURES

RELATED APPLICATIONS

This application is a continuation application of co-pending application Ser. No. 806,811 filed June 15, 1977, now abandoned.

This invention relates to compressive load carrying bearings and more particularly to laminated bearings of the type comprising alternating bonded layers of a resilient material such as an elastomer and a non-extensible material such as a metal.

It is well known that the compressive load carrying ability of a given thickness of an elastomer material may be increased many times by subdividing it into a plurality of layers and separating the layers by intervening layers of a non-extensible material. At the same time, however, the ability of the resilient material to yield in shear or torsion in a direction parallel to the layers is substantially unaffected. This concept has been adopted or utilized in the design of different forms of laminated bearings, as exemplified by the following U.S. Pat. Nos.: Schmidt, 3,679,197; Boggs, 3,377,110; Orain, 2,995,907; Hinks, 2,900,182; and Wildhaber, 2,752,766. Laminated bearings of various types are commonly used in commercial applications where it is necessary to carry large compressive loads in a first direction and also to accommodate limited relative movement in other directions. The bearings are designed so that the large compressive loads are carried generally perpendicular to the resilient lamellae. A significant commercial variety of bearings is characterized by the alternating bonded lamellae being disposed concentrically about a common center, i.e., so that successive alternating layers of resilient and non-extensible materials are disposed at successively greater radial distances from the common center. This variety of bearings includes a number of different configurations, notably bearings which are cylindrical, conical or generally spherical in shape or which are essentially sectors of cylinders, cones and spheres. Such bearings typically are used in aircraft, especially as rotor shaft supports in helicopters. As noted by Schmidt, supra, bearings of this type frequently are required to accommodate cylic torsional motion about a given axis while similtaneously carrying a large compressive load along that axis, with the result that greater compressive stresses and shear stresses and strains are established in the resilient layers closest to the common center and failure from fatigue encountered in accommodating the torsional motion tends to occur at the innermost resilient layer. Schmidt proposed to improve the fatigue life of such bearings by progressively increasing the thicknesses of successive layers of resilient material with increasing radius and simultaneously to progressively decrease the modulus of elasticity of those same layers with increasing radius. However, the Schmidt technique is expensive in that it requires that each elastomer layer be made of a different material. Thus an elastomeric bearing consisting of fifteen resilient layers necessitates provision of fifteen different elastomer materials. Even though this is commonly achieved by subdividing a basic elastomer feedstock into fifteen lots and modifying each lot with a different amount of type of additive, the fact remains that it is costly, time consuming and inconvenient to provide a different material for each resilient layer. Furthermore, care must be taken to assure that the materials are properly identified so that they will be correctly arranged with modulus of elasticity decreasing with increasing radius as prescribed by Schmidt.

Accordingly the primary object of this invention is to provide a method of making laminated bearings of the type described whereby a relatively large number of resilient layers each exhibiting a different effective modulus of elasticity may be provided using as few as two different resilient stocks.

Another object of this invention is to provide a method of increasing the compressive spring rates of laminated elastomeric bearings while reducing or at least not increasing the shear rates of the same parts.

A further object is to improve the fatigue life of laminated bearings and in particular to provide an elastomeric bearing which not only combines a high shear to allowable compressive load ratio but also has an improved fatigue life due to use of softer resilient materials with less strain energy in sections of a resilient layer which tend to have larger strains.

Still other objects are to provide new laminated bearings and a method of making same whereby the capability exists to vary the shear stiffness in different motion directions in the same section of the bearings, to accommodate for specific strain distributions encountered in different applications, and also to provide bearings with resilient material selected and arranged to provide end bulging restraint for the purpose of maintaining compressive stiffness and reducing bearing failure from extrusion and fretting erosion.

The foregoing objects, and whatever other objects and advantages are hereinafter described or rendered obvious, are achieved by forming each of at least some of the resilient layers in a laminated bearing out of sections of at least two materials having different moduli of elasticity. Preferably the resilient layers are formed in three sections disposed end to end lengthwise of the bearing, with the two end sections having a greater compressive stiffness than the center section and serving as end bulging restraints or dams for the softer center section. Other features, modifications and advantages are set forth in or rendered obvious by the following detailed descriptions which is to be considered together with the drawings wherein:

In the several figures the same numerals are employed to designate the same parts.

Figure 1:
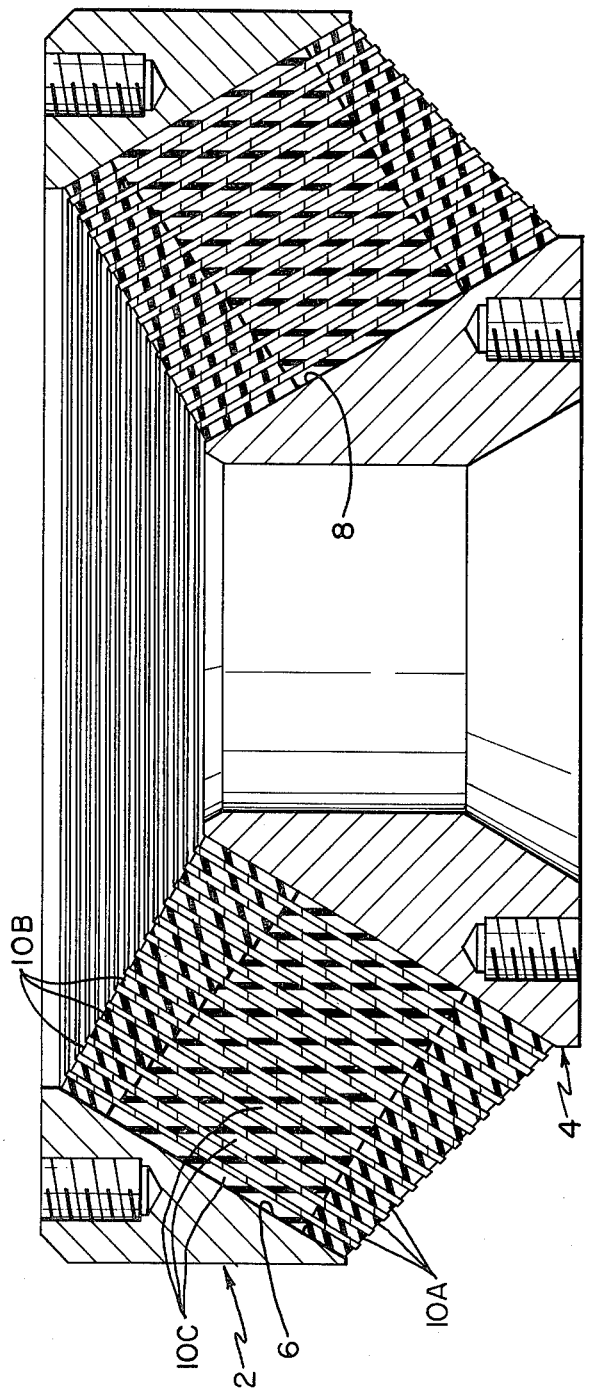
FIG. 1 is a longitudinal sectional view of the components of a conical bearing assembly made in accordance with this invention as the components appear prior to molding and bonding the resilient material to the associated metal parts.

As is well known to persons skilled in the art, a primary consideration in the design of elastomeric bearings and other elastomeric mountings which primarily accommodate compressive loads is the so-called shape factor. In the case of an elastomeric compression pad, the more restriction that is imposed on its freedom to deform, the stiffer it will become. This parameter, which is frequently referred to as the bulge area or force free area, can be used to control the stiffness of a bonded rubber pad subjected to compressive loading. The stiffness of a given compression pad is a direct function of its shape factor, so that the greater the shape factor the greater the allowable compressive load of the pad. The shape factor is the ratio of the loaded area of the pad to the bulge area of the same pad. Considering, for example, a bearing or other mount comprising an elastomer pad sandwiched between and bonded to two stiff metal plates, with the pad and plates each having the same length L and the same width W and the pad also having a thickness t, the loaded area LA and the bulge area BA are defined as follows:

$$LA = L \times W$$

$$BA = 2t(L+W)$$

Accordingly, the shape factor SF is represented as:

$$SF = LW/[2t(L+W)]$$

It is apparent that decreasing the bulge area without decreasing the load area will have the effect of increasing the shape factor and thus the allowable compressive load. Also if the bulge area is restricted or reduced while the shape factor is increased, the bearing structure will become more anistropic in the sense that the shear stiffness will be unaffected or change only a minor amount at the same time that the allowable compressive stress is increased.

Resorting to a laminated construction in a bearing or other mount as previously mentioned offers the advantage that if the overall thickness of the elastomer pad configuration is maintained, the shape factor and hence the stiffness is greatly increased due to a decrease in the free bulge area. At the same time, however, since the thickness of the metal sheets or shims separating the elastomer layers are relatively small in relation to the overall thickness of the laminated pad, essentially the single effect of the intermediate shims is to reduce the freedom of the elastomer layers to bulge. This bulge restriction has substantially no effect on shear stiffness. Accordingly an important aspect of this invention is that it provides a way of increasing bulge restriction of the resilient layers in a laminated bearing or other mount for the purpose of increasing the compressive spring rate, while at the same time providing a relatively low shear stiffness in those same layers. In the preferred embodiment of the invention this is achieved by making each resilient layer so that it essentially consists of two bulge restrainers or dams made of a relatively stiff resilient stock and an intermediate section made of softer stock which is trapped between the two bulge restrainers. The latter are bonded to the intermediate sections so as to form a single resilient layer characterized by relatively stiff end sections and a relatively soft center section. The stiff end sections prevent bulging and also cooperate with the center section to give a composite or net modulus of elasticity of selected value, while at the same time the center section functions to keep the shear stiffness of the single layer at a low value. This use of relatively stiff and relatively soft elastomers to form resilient layers is an effective way to maintain low torsional stiffness while increasing compressive load stiffness.

Figure 2:
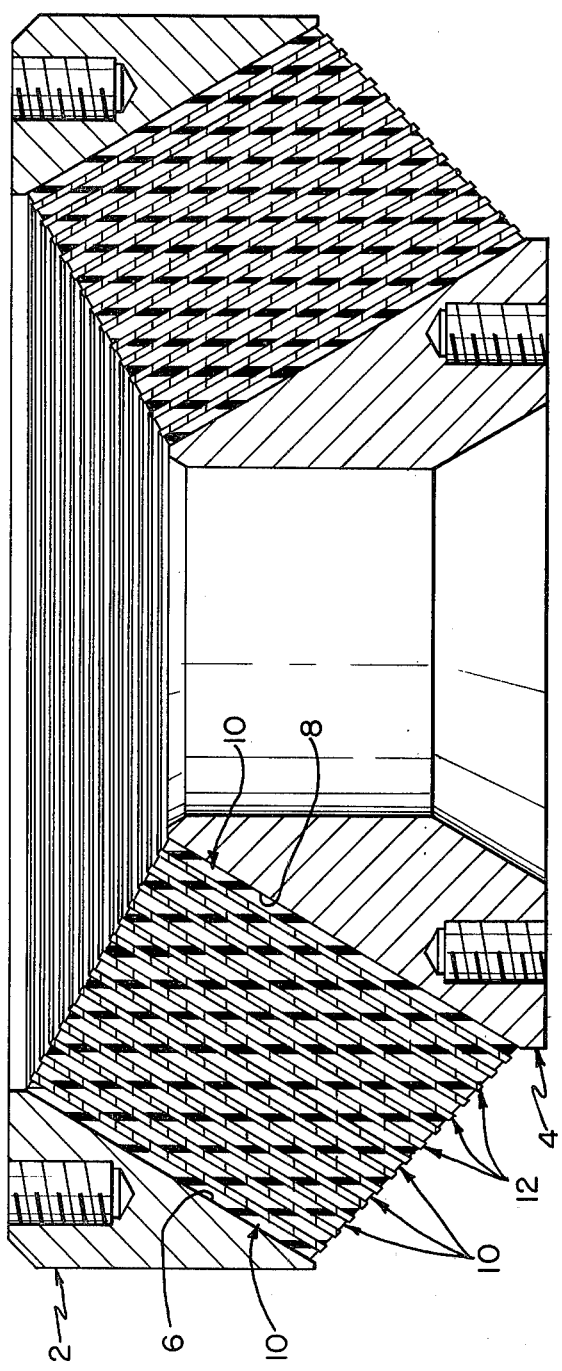
FIG. 2 shows the conical bearing assembly as it appears after molding and bonding.

Turning now to FIGS. 1 and 2, a conical laminated bearing may be made according to this invention by providing two annular metal end members 2 and 4 which have frusto-conical inner and outer surfaces 6 and 8 respectively. As shown in FIG. 2, in the completed bearing alternating bonded layers of a resilient material 10 and a non-extensible material 12 are disposed between end members 2 and 4, with surfaces 6 and 8 of the latter bonded to a layer of resilient material. The resilient material preferably is an elastomer such as a natural or synthetic rubber, but it also may be a suitable plastic material. The non-extensible material may be a suitable metal such as stainless steel. As is evident from FIG. 2, the layers 10 and 12 are frusto-conical in shape and extend generally parallel to and coaxial with the surfaces 6 and 8 of the two rigid metal end members.

In this case the layers 10 and 12 are of uniform thickness, but the non-extensible layers 12 (which are commonly called shims) are thinner than the resilient layers. Additionally, the resilient layers are made so that they have greater stiffness at their opposite ends than at their midpoints and so that the effective modulus of elasticity of the individual layers decreases with increasing radius. This resilient layer arrangement is achieved by making each of resilient layers 10 from two different resilient stocks arranged in the manner illustrated in FIG. 1.

Referring to FIG. 1, each resilient layer 10 is made up by laying onto one of the end members, e.g., member 4, a composite layer made up of two frusto-conical end sections 10A and 10B and a frusto-conical center section 10C, with sections 10A and 10B being made of the same resilient material having a selected stiffness and section 10C being made of another softer resilient material, i.e., a material with less stiffness than sections 10A and 10B. The sections are applied so that they abut one another as shown. Then a shim 12 is placed over this composite layer and a second composite layer is applied over the shim. This second layer is identical to the first layer except that its sections 10A and 10B have a smaller width than the corresponding section of the first layer. As used in this context, the term "width" refers to the dimension extending parallel to the layers 12 as shown in FIG. 1. A second shim is placed over this second composite resilient layer and then a third composite layer is laid up over the second shim. This third composite layer is the same as the second except that its end sections 10A and 10B are narrower than the end sections of the second layer. The process of building up alternating resilient and non-extensible layers is repeated with the end sections 10A and 10B of each resilient layer having a smaller width than the corresponding sections of the preceding inner layer. After the desired number of resilient layers has been laid up, the other end member is engaged with the last resilient layer and then the assembled parts are forced together in a mold under suitable heat and presssure so as to cause the resilient sections 10A, B and C to bond to each other and also to the adjacent shims 12 or end members 2 or 4, with the result that each group of resilient sections 10A, B and C is integrated to form a single resilient layer 10 which has greater stiffness at its ends, and commencing at end member 4 and proceeding outwardly to end member 2, succeeding resilient layers have progressively wider soft center sections and progressively narrower stiff end section. Accordingly as noted previously, each succeeding resilient layer proceeding outwardly from end member 4 has a progressively smaller net modulus of elasticity. By properly varying the sizes of the end sections 10A and 10B relative to center sections 10C, it is possible to equalize the strain distribution as accomplished by Schmidt for the purpose of improving the fatigue life of the laminated structure. At the same time the relatively stiff end sections of the resilient layers have the effect of improving the allowable compressive load since they restrain bulging of the softer center sections. If desired, the layers 10 also may be made so that their thicknesses increase with increasing radius, as in the bearings disclosed by Schmidt, or conversely their thicknesses decrease with increasing radii.

The above described method of making a bearing as shown in FIG. 2 is especially suitable where the resilient stock is an elastomer which can be fused and molded under heat and pressure. Where the resilient stock is a rubber, the bonding step involves vulcanization. Other aspects of the procedure of assembling and bonding the array of resilient layers, metal shims and the bearing members 2 and 4 are well known to persons skilled in the art of making laminated elastomer bearings and are not described herein in detail since they are old and form no part of this invention. Suffice it to say, however, that the metal shims and bearing members are required to be cleaned to facilitate bonding and the bonding of the resilient layers to those members usually involves the use of a bonding agent or cement. Also the laying up of the shims and resilient layer components may be accomplished using suitable jig fixtures or may be accomplished in the mold which is used to carry out the bonding step.

Figure 3:
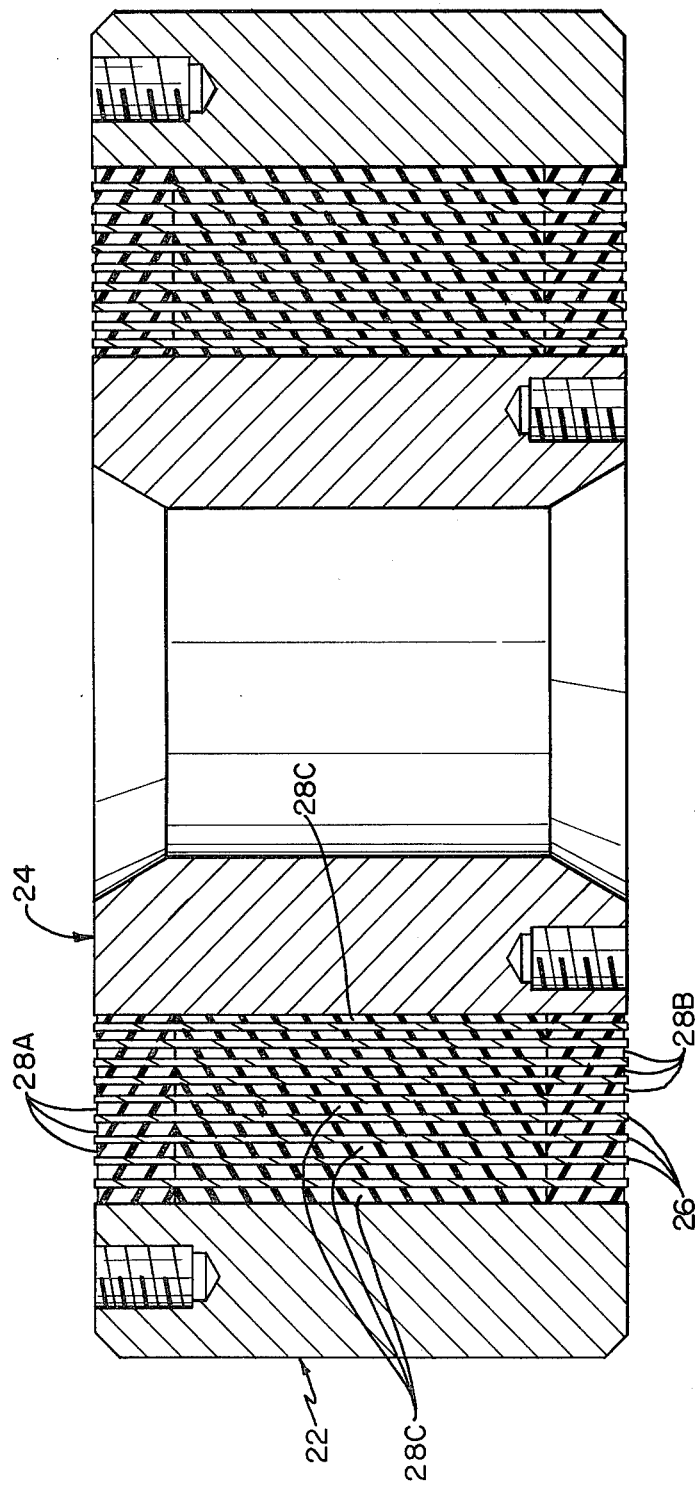
FIG. 3 is a longitudinal sectional view similar to FIG. 1 showing the components of a cylindrical bearing made in accordance with this invention.

FIG. 3 shows how the invention is applied to the manufacture of a cylindrical laminated bearing. In this case the assembled components comprise cylindrical inner and outer bearing members 22 and 24 and intervening cylindrical metal shims 26 which are separated from one another by three-part resilient layers consisting of end sections or dams 28A and B and center sections 28C. The metal shims are of uniform thickness but the resilient layers are not shown as such, although it is readily understood that they may be of uniform thickness as illustrated in FIGS. 1 and 2. The thicknesses of the resilient layers as shown in FIG. 3 increase with increasing diameter, although it should also be apparent that they may decrease with increasing diameter. With respect to each individual layer, its component parts 28A, B and C have identical thicknesses but differ in that the end parts 28A and B are made of the same resilient material which is relatively stiff, while the center part 28C is made of a different relatively soft resilient material. However, the end sections 28A and B of each resilient layer may be made of the same material as the end sections of every other resilient layer, all of the center sections 28C may also be made of the same material. In contrast to the bearing shown in FIG. 1, the end sections 28A and B have the same width, i.e. the dimension measured parallel to the bearing axis. Although not shown, it is to be understood that the setup of FIG. 3 is compressed under heat and pressure so that the three parts of each resilient layer will bond to one another and also to the adjacent shims and bearing members so as to form a unified laminated bearing structure. Of course, in this case the dams, i.e., sections 28A and B, serve primarily as bulge restrainers and the net modulus of elasticity of each resilient layer is the same as all of the others. However, if desired the widths of the dams may be decreased or increased with increasing radius, e.g. as described in connection with FIGS. 1 and 2 so that the net modulus of elasticity of the individual resilient layers will decrease or increase with increasing radius. It also is contemplated that the bearings may be made so that the thickness and/or the modulus of elasticity of the resilient layers will vary according to a step function. Thus, for example, in a cylindrical or conical bearing with fifteen resilient layers, the first three layers commencing nearest the center axis may have a net modulus of elasticity and/or a thickness which differs from the next three layers, and succeeding groups of three layers each may differ from the others in elasticity and/or thickness.

The invention may be practiced otherwise than as already described and illustrated. Thus, for example, it is possible to manufacture bearings wherein the use of bulge restrainers or dams made of relatively stiff resilient stock are confined to one end of the bearing. In other words, with respect to the embodiment of FIG. 1, the bearing could be made by eliminating the resilient sections 10B and extending the length of the sections 10C. It is contemplated also that the use of dams or bulge restrainers may be omitted entirely, from some of the resilient layers. Thus, for example, conical bearings have been made according to the present invention wherein the use of stiff stock bulge restrainers has been limited to a selected number of the resilient layers closest to the outer side of the bearing. In a specific application, a conical bearing similar to the one shown in FIGS. 1 and 2 has been made which comprised fifteen resilient layers, with bulge restrainers or dams being used only in the seven outermost layers.

A further possible modification of the invention consists of reversing the arrangement of resilient sections so that the center section is made of stiffer stock than the two end sections. This particular arrangement is suitable in certain bearing geometries where the stiff stock sections would carry loads where the motions are relatively low and the soft stock sections carry the loads where the motions are higher. Another example where such an arrangement would be used is a circular laminated bearing pad consisting of upper and lower end bearing members in the form of circular disks bonded to an array of alternating circular disk layers of resilient material and non-extensible material, with the bearing pad being mounted so that it supports a compressive load applied normal to the alternating layers but also is required to accommodate and withstand torsional motions about its center axis. In such a case the resilient layers experience greater deflection and thus greater strain at their peripheries under torsion loads. Therefore, in accordance with this invention, each resilient layer would be made in at least two parts, a circular relatively stiff center section and an annular relatively soft outer section. Of course, each resilient layer could be made with a number of annular sections concentrically surrounding the center section, with the annular sections being progressively softer with increasing radius. In this case as in the other possible embodiments of the invention, the outer or end sections of the composite resilient layers may be made of materials with a greater environmental resistance than the inner sections. Of course, the relative length of the sections 28c may be progressively decreased so as to provide a tapered flat bearing.

As previously noted, the invention offers a number of advantages, of which the principal advantage is that bearings of selected compressive and torsional characteristics can be constructed using as little as two different resilient stocks. At the same time, however, it is possible to fabricate the resilient layers so that they contain more than two different resilient stocks. Thus, for example, it may be desirable for a specific application requiring a conical bearing such as shown in FIGS.

1 and 2 to have the end sections 10B made of stiffer stock than the end sections 10A, with both end sections being stiffer than the intermediate sections 10C. A further important advantage of the invention is that the use of relatively stiff end sections assists in reducing bearing failure as a result of extrusion and fretting erosion which tend to occur at the exposed ends of the resilient layers as the bearing undergoes repeated torsional and compressive loading. Still other advantages and modifications will be obvious to persons skilled in the art.

What is claimed is:

1. A compressive load carrying laminated bearing comprising a plurality of alternating resilient layers and non-extensible layers generally concentrically disposed about a common center, at least some of said resilient layers each comprising at least first and second end portions at opposite ends of said bearing and a third portion between said first and second end portions, said first and second end portions having a modulus of elasticity which is different from the modulus of elasticity of said third portion, said first and second end portions being made of a first material and said third portions being made of a second material, and the respective widths of said portions being such that the effective moduli of elasticity of said at least some layers differ inversely with the distance between said at least some layers and said common center.

2. A laminated bearing according to claim 1 wherein successive layers are disposed at successively increasing radii about the common center and the thickness of at least two of said resilient layers differs from one another.

3. A laminated bearing according to claim 1 wherein the thicknesses of said resilient layers are substantially the same.

4. A laminated bearing according to claim 1 wherein all of said first and second end portions have the same modulus of elasticity.

5. A laminated bearing according to claim 1 wherein all of said resilient layers comprise first and second end portions at opposite ends of said bearing and a third portion between said first and second end portions.

6. A laminated bearing according to claim 1 wherein at least one of said resilient layers has first and second end portions with a greater modulus of elasticity than the third portion thereof.

7. A laminated bearing according to claim 6 wherein all of the resilient layers in said bearing have said first, second and third portions and the first and second end portions all have the same modulus of elasticity.

8. A laminated bearing according to claim 1 wherein at least one of said resilient layers has first and second end portions with a smaller modulus of elasticity than the third portion thereof.

9. A laminated bearing according to claim 1 wherein said layers are conically shaped.

10. A compressive load carrying laminated bearing comprising a plurality of alternating resilient layers and non-extensible layers generally concentrically disposed about a common center, at least some of said resilient layers each comprising at least first and second end portions at opposite ends of said bearing and a third portion between said first and second end portions, said first and second end portions having a modulus of elasticity which is different from the modulus of elasticity of said third portion, at least some of said third portions having widths which differ as a function of the distance from said common center so that the effective moduli of elasticity of said at least some layers differ as a function of the distance between said at least some layers and said common center.

* * * * *